(12) United States Patent
Ko et al.

(10) Patent No.: US 12,523,900 B2
(45) Date of Patent: Jan. 13, 2026

(54) DISPLAY DEVICE

(71) Applicant: CARUX TECHNOLOGY PTE. LTD., Singapore (SG)

(72) Inventors: Hsin-Chuan Ko, Tainan (TW); Ya-Ching Chuang, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 13 days.

(21) Appl. No.: 18/509,535

(22) Filed: Nov. 15, 2023

(65) Prior Publication Data

US 2024/0219759 A1 Jul. 4, 2024

(30) Foreign Application Priority Data

Dec. 28, 2022 (CN) .......................... 202211715021.2

(51) Int. Cl.
*G02F 1/1333* (2006.01)
*G02F 1/13357* (2006.01)

(52) U.S. Cl.
CPC .. *G02F 1/133308* (2013.01); *G02F 1/133311* (2021.01); *G02F 1/133314* (2021.01); *G02F 1/133608* (2013.01)

(58) Field of Classification Search
None
See application file for complete search history.

(56) References Cited

U.S. PATENT DOCUMENTS 7,920,222 B2 4/2011 Chen et al.
10,101,524 B2 * 10/2018 Tanaka ................. G02B 6/0088

FOREIGN PATENT DOCUMENTS

CN 108181758 B 11/2020
TW 200921196 A 5/2009

* cited by examiner

*Primary Examiner* — Dung T Nguyen
(74) *Attorney, Agent, or Firm* — JCIPRNET

(57) ABSTRACT

A display device is provided, including a backlight module, a panel, a first adhesive material, and a second adhesive material. The backlight module includes a backplane. The panel is disposed on the backplane and includes a display area. The first adhesive material is disposed between the backplane and the panel, and the first adhesive material has a protruding portion adjacent to the display area. The second adhesive material is disposed between the backplane and the panel. The protruding portion overlaps the second adhesive material.

15 Claims, 6 Drawing Sheets

DISPLAY DEVICE

CROSS REFERENCE TO RELATED APPLICATIONS

This Application claims priority of China Patent Application No. 202211715021.2, filed on Dec. 28, 2022, the entirety of which is incorporated by reference herein.

BACKGROUND OF THE INVENTION

Field of the Invention

The present disclosure relates to a display device, and in particular to a display device that capable of preventing foreign substances from entering the interior.

Description of the Related Art

Existing display devices use adhesive materials to combine panels and backlight modules. In large-size display devices, the adhesive materials are attached end-to-end in a segmented manner. Therefore, foreign substances or water may enter the display devices through the gaps between the adhesive materials, thereby affecting the stability of the display device.

Therefore, a design that capable of preventing foreign substances or water from entering the display device through the gaps between the adhesive materials is desired, so as to improve the existing disadvantages.

BRIEF SUMMARY OF THE INVENTION

An embodiment of the present invention provides a display device, including a backlight module, a panel, a first adhesive material, and a second adhesive material. The backlight module includes a backplane. The panel is disposed on the backplane and includes a display area. The first adhesive material is disposed between the backplane and the panel, and the first adhesive material has a protruding portion adjacent to the display area. The second adhesive material is disposed between the backplane and the panel. The protruding portion overlaps the second adhesive material.

An embodiment of the present invention provides a display device, including a backlight module, a panel, a first adhesive material, a second adhesive material, and a glue material. The backlight module includes a backplane. The panel is disposed on the backplane and includes a display area. The first adhesive material is disposed between the backplane and the panel. The first adhesive material has a protruding portion away from the display area. The second adhesive material is disposed between the backplane and the panel. The second adhesive material is adjacent to the protruding portion. The glue material is disposed between the backplane and the panel. In the plan view direction, the glue material is disposed between the first adhesive material and the second adhesive material, and the glue material is disposed between the protruding portion and the display area.

BRIEF DESCRIPTION OF THE DRAWINGS

The present invention may be more fully understood by reading the subsequent detailed description and examples with references made to the accompanying drawings, wherein.

DETAILED DESCRIPTION OF THE INVENTION

Figure 1:
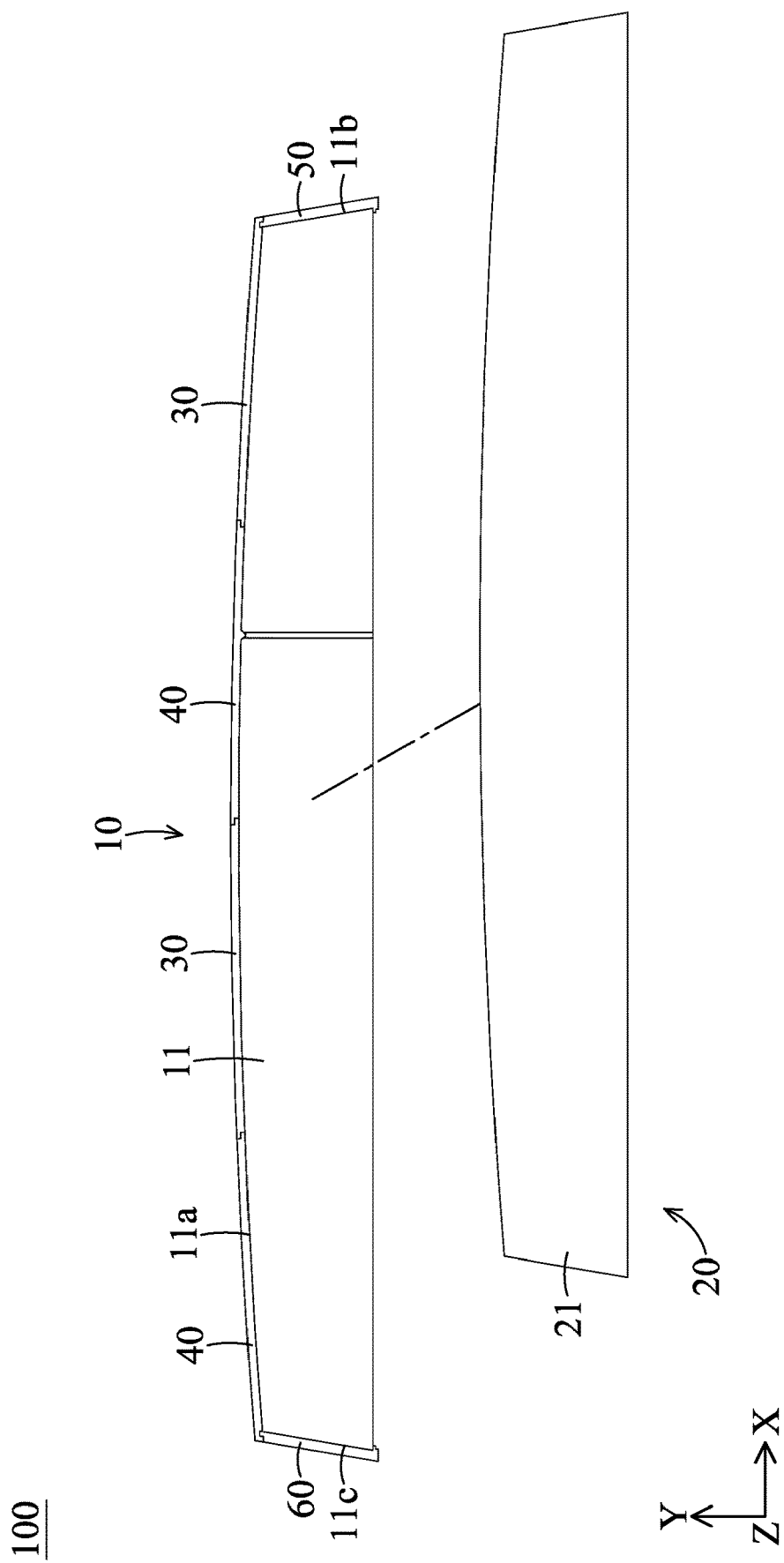
FIG. 1 is a display device according to some embodiments of the present disclosure.

The present disclosure may be more clearly understood by referring to the following description and the appended drawings. It should be noted that, for the sake of the simplicity of the drawings and comprehensibility for readers, only a portion of the light-emitting unit is illustrated in multiple figures in the present disclosure, and the specific components in the figures are not drawn to scale. In addition, the number and size of each component in the drawings merely serve as an example, and are not intended to limit the scope of the present disclosure. Furthermore, similar and/or corresponding numerals may be used in different embodiments for describing some embodiments simply and clearly, but they do not represent any relationship between different embodiments and/or structures discussed below.

Certain terms may be used throughout the present disclosure and the appended claims to refer to particular elements. Those skilled in the art will understand that electronic device manufacturers may refer to the same components by different names. The present specification is not intended to distinguish between components that have the same function but different names. In the following specification and claims, the words "including", "comprising", "having" and the like are open-ended words, so they should be interpreted as meaning "including but not limited to . . . " Therefore, when the terms "including", "comprising", and/or "having" are used in the description of the disclosure, the presence of corresponding features, regions, steps, operations and/or components is specified without excluding the presence of one or more other features, regions, steps, operations and/or components.

In addition, in this specification, relative expressions may be used. For example, "lower", "bottom", "higher" or "top" are used to describe the position of one element relative to another. It should be noted that if a device is flipped upside down, an element that is "lower" will become an element that is "higher".

When a corresponding component (i.e. a film layer or region) is referred to as "on another component", it may be directly on another component, or there may be other components in between. On the other hand, when a component is referred "directly on another component", there is no component between the former two. In addition, when a component is referred "on another component", the two components have an up-down relationship in the top view, and this component can be above or below the other component, and this up-down relationship depends on the orientation of the device.

The terms "about," "equal to," "equivalent," "the same as," "essentially," or "substantially" are generally interpreted as within 20% of a given value or range, or as interpreted as within 10%, 5%, 3%, 2%, 1%, or 0.5% of a given value or range.

In the present application, when mentioning that the A element overlaps the B element, it means to include at least partial overlap.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

In the present disclosure, the thickness, length, and width can be measured by using an optical microscope, and the thickness can be measured by the cross-sectional image in the electron microscope, but it is not limited thereto. In addition, a certain error may be present in a comparison with any two values or directions. If the first value is equal to the second value, the deviation between the first value and the second value may be within about 10%. If the first direction is perpendicular to the second direction, the angle between the first direction and the second direction may be between 80 degrees and 100 degrees. If the first direction is parallel to the second direction, the angle between the first direction and the second direction may be between 0 degrees and 10 degrees.

It should be noted that the technical solutions provided by different embodiments below may be interchangeable, combined or mixed to form another embodiment without departing from the spirit of the present disclosure.

Unless defined otherwise, all terms (including technical and scientific terms) used herein have the same meaning as commonly understood by one having ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

The electronic device may include a display device, a backlight device, an antenna device, a sensing device or a splicing device, but it is not limited thereto. The electronic device may be a bendable or flexible electronic device. The display device may be a non-self-luminous display device or a self-luminous display device. The antenna device may be a liquid crystal type antenna device or a non-liquid crystal type antenna device, and the sensing device may be a sensing device for sensing capacitance, light, thermal energy or ultrasonic waves, but it is not limited thereto. The electronic devices may include passive devices and active devices, such as capacitors, resistors, inductors, diodes, transistors, and the like. The diodes may include light emitting diodes or photodiodes. The light emitting diode may include, for example, an organic light emitting diode (OLED), a mini LED, a micro LED or a quantum dot LED, but it is not limited thereto. The splicing device may be, for example, a display splicing device or an antenna splicing device, but it is not limited thereto. It should be noted that, the electronic device may be any combination mentioned above, but it is not limited thereto. In the following, a display device is used as an electronic device or a splicing device to illustrate the content of the present application, but the present application is not limited thereto.

Please refer to FIG. 1, FIG. 1 illustrates a display device 100 according to some embodiments of the present disclosure. According to some embodiments of the present disclosure, the display device 100 may be a monitor, a touch display, a curved display, a free shape display, etc., but the present disclosure is not limited thereto.

As shown in FIG. 1, the display device 100 may include a backlight module 10, a panel 20, a first adhesive material 30, a second adhesive material 40, a third adhesive material 50, and a fourth adhesive material 60.

The backlight module 10 may include a backplane 11. According to some embodiments of the present disclosure, the backplane 11 may have a substantially rectangular shape. According to some embodiments of the present disclosure, the backplane 11 may have a long side 11a, a first short side 11b, and a second short side 11c. According to some embodiments of the present disclosure, the long side 11a of the backplane 11 may substantially extend along the X-axis, and the first short side 11b and the second short side 11c of the backplane 11 may substantially extend along the Y-axis.

According to some embodiments of the present disclosure, the first short side 11b may be connected to the long side 11a, and the second short side 11c may be connected to the long side 11a. For example, two ends of the long side 11a may be respectively connected with the first short side 11b and a second short side 11c to form a portion of the edge of the backplane 11.

According to some embodiments of the present disclosure, the panel 20 may be disposed on the backplane 11. Moreover, the panel 20 may include a display area 21.

According to some embodiments of the present disclosure, the panel 20 may include a display panel, a sensing panel, a touch panel, an antenna panel, a luminous panel, a handwriting panel, other panels, or any combination of the above, but the present disclosure is not limited thereto.

According to some embodiments of the present disclosure, the panel 20 may be a submillimeter light emitting diode (mini LED), a micro light emitting diode (micro LED), an organic light emitting diode (OLED), or a reflective liquid crystal display (reflective LCD), but the present disclosure is not limited thereto.

Figure 2:
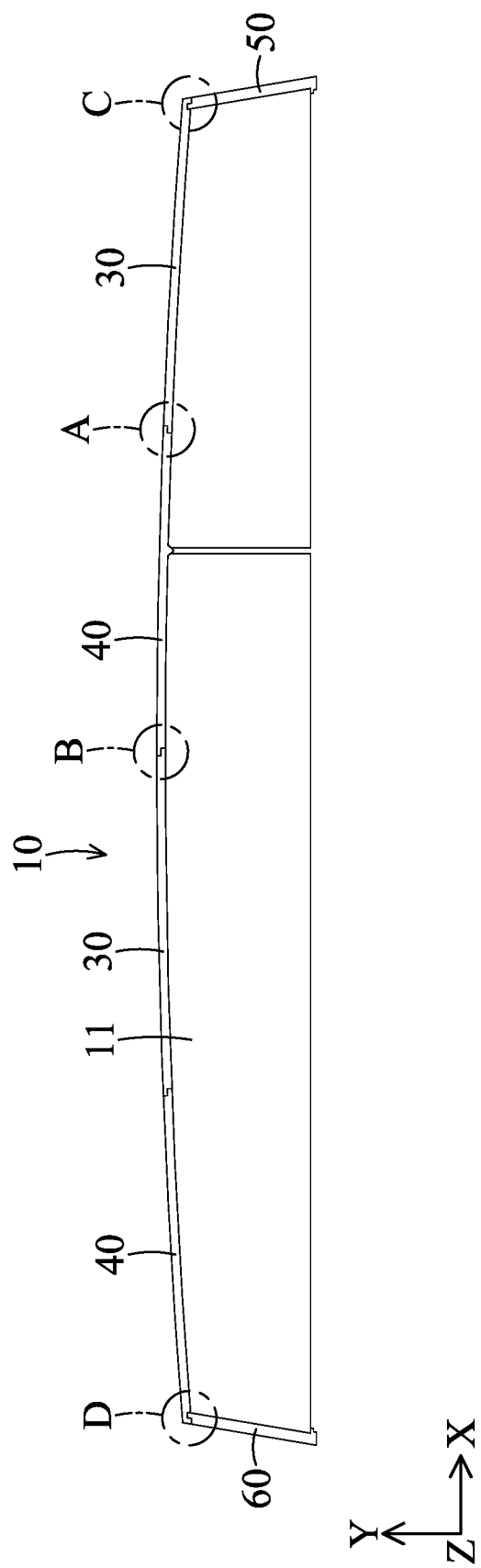
FIG. 2 is a schematic view of a display device according to some embodiments of the present disclosure, wherein the panel is not shown.

Please refer to FIG. 1 and FIG. 2 at the same time, wherein FIG. 2 is a schematic view of a display device 100 according to some embodiments of the present disclosure, wherein the panel 20 is not shown.

The first adhesive material 30 may be disposed between the backplane 11 and the panel 20. Moreover, the first adhesive material 30 may be disposed on the edge of the backplane 11. According to some embodiments of the present disclosure, the first adhesive materials 30 may be disposed on the long side 11a of the backplane 11, and the first adhesive materials 30 may be arranged along the extending direction of the long side 11a.

The second adhesive material 40 may be disposed between the backplane 11 and the panel 20. Moreover, the second adhesive material 40 may be disposed on the edge of the backplane 11. According to some embodiments of the present disclosure, the second adhesive material 40 may be disposed on the long side 11a of the backplane 11, and the first adhesive materials 30 may be arranged along the extending direction of the long side 11a, and the first adhesive materials 30 may be connected end to end with the first adhesive material 30.

The third adhesive material 50 may be disposed between the backplane 11 and the panel 20. Moreover, the third adhesive material 50 may be disposed on the edge of the backplane 11. According to some embodiments of the present disclosure, the third adhesive material 50 may be disposed on the first short side 11b of the backplane 11, and the third adhesive material 50 may be in contact with the first adhesive material 30 end to end.

The fourth adhesive material 60 may be disposed between the backplane 11 and the panel 20. Moreover, the fourth adhesive material 60 may be disposed on the edge of the backplane 11. According to some embodiments of the present disclosure, the fourth adhesive material 60 may be disposed on the second short side 11c of the backplane 11, and the fourth adhesive material 60 may be in contact with the second adhesive material 40 end to end.

In the embodiment shown in FIG. 2, the first adhesive material 30 and the second adhesive material 40 may be arranged on the long side 11a of the backplane 11, and the first adhesive material 30 and the second adhesive material 40 may be attached along the extending direction (X-axis) of side 11a.

In the embodiment shown in FIG. 2, the third adhesive material 50 may be disposed on the first short side 11b of the backplane 11, and the third adhesive material 50 may be attached along the extending direction (Y-axis) of the first short side 11b.

In the embodiment shown in FIG. 2, the fourth adhesive material 60 may be disposed on the second short side 11c of the backplane 11, and the fourth adhesive material 60 may be attached along the extending direction (Y-axis) of the second short side 11c.

According to some embodiments of the present disclosure, the first adhesive material 30, the second adhesive material 40, the third adhesive material 50 and the fourth adhesive material 60 may be double sided adhesive (DSA).

For example, the first adhesive material 30, the second adhesive material 40, the third adhesive material 50 and the fourth adhesive material 60 may include Very High Bonding Tape (VHB Tape), General Purpose High Temperature Tape (GPH Tape), etc., but the present disclosure is not limited thereto.

Therefore, the backplane 11 and the front panel 20 may be connected to each other through the first paste material 30, the second paste material 40, the third paste material 50 and the fourth paste material 60.

Figure 4:
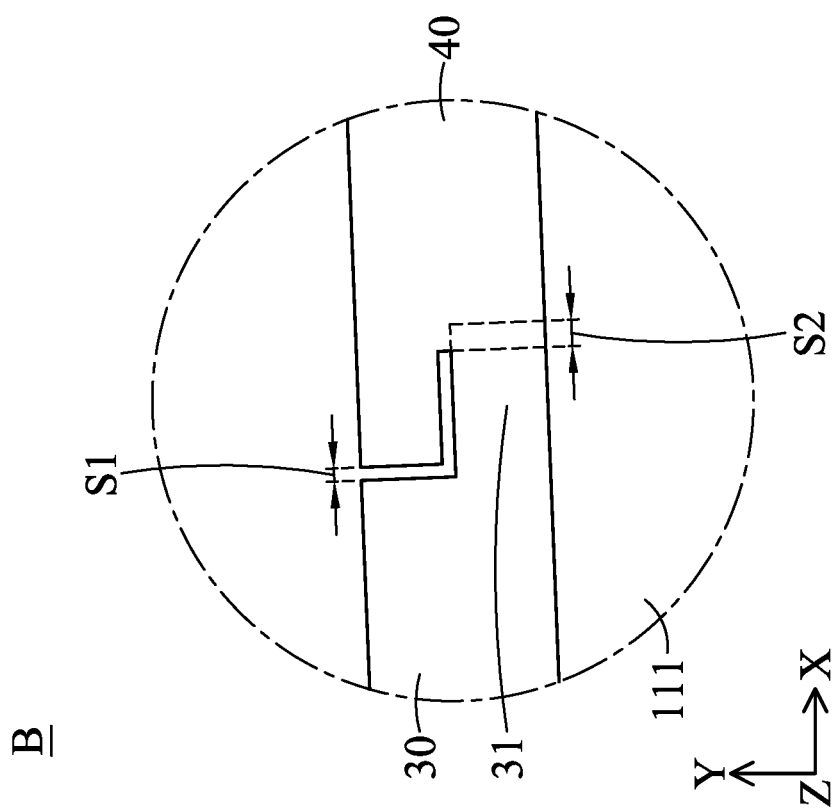
FIG. 4 is an enlarged view of area B in FIG. 2.
Figure 3:
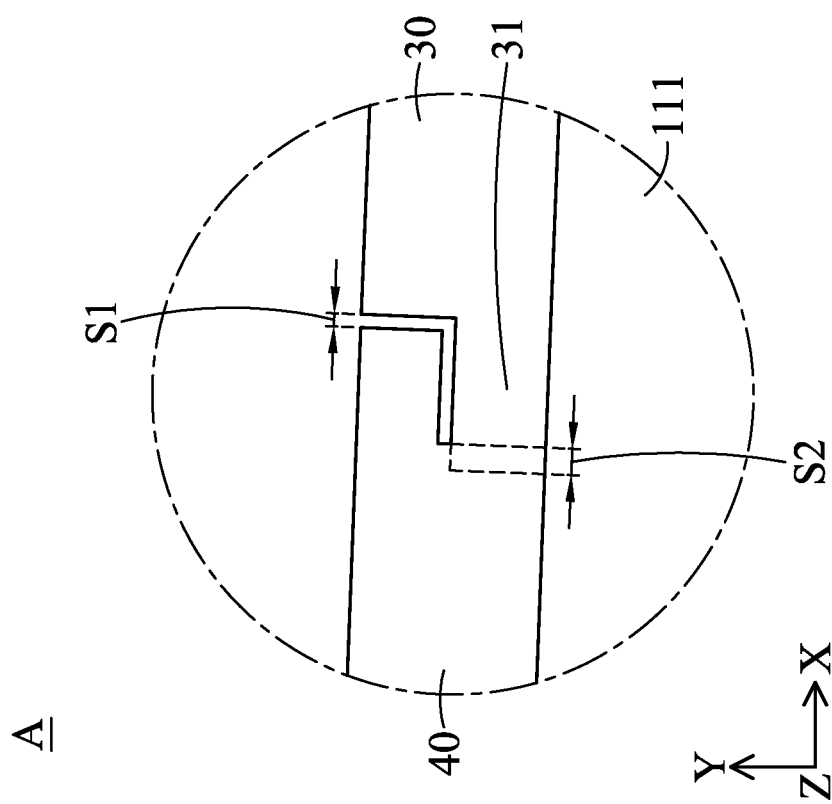
FIG. 3 is an enlarged view of area A in FIG. 2.

Please refer to FIG. 3 and FIG. 4 at the same time, wherein FIG. 3 is an enlarged view of area A in FIG. 2, and FIG. 4 is an enlarged view of area B in FIG. 2.

FIG. 3 may also be a schematic view of a protruding portion 31 of the first adhesive material 30 and the second adhesive material 40 according to some embodiments of the present disclosure, wherein the dotted line represents the portion where the protruding portion 31 of the first adhesive material 30 overlaps the second adhesive material 40.

FIG. 4 may also be a schematic view of the protruding portion 31 of the first adhesive material 30 and the second adhesive material 40 according to some embodiments of the present disclosure, wherein the dotted line represents the portion where the protruding portion 31 of the first adhesive material 30 overlaps the second adhesive material 40.

As shown in FIG. 3 and FIG. 4, the first adhesive material 30 may have a protruding portion 31, and the protruding portion 31 of the first adhesive material 30 may be adjacent to a middle portion 111 of the backplane 11. In other words, the protruding portion 31 of the first adhesive material 30 is closer to the middle portion 111 of the backplane 11, and the protruding portion 31 of the first adhesive material 30 is farther away from the edge of the backplane 11.

Please return to FIG. 1, the middle portion 111 of the backplane 11 may correspond to the display area 21 of the panel 20. In other words, in the top view direction (e.g., Z-axis), the middle portion 111 of the backplane 11 may overlap the display area 21 of the panel 20.

Therefore, the protruding portion 31 of the first adhesive material 30 may be adjacent to the display area 21 of the panel 20. In other words, the protruding portion 31 of the first adhesive material 30 is closer to the display area 21 of the panel 20, and the protruding portion 31 of the first adhesive material 30 is farther away from the edge of the backplane 11.

As shown in FIG. 3 and FIG. 4, there may be a distance S1 between the first adhesive material 30 and the second adhesive material 40. According to some embodiments of the present disclosure, the distance S1 between the first adhesive material 30 and the second adhesive material 40 may be between 0 and about 1 millimeter (mm). According to some embodiments of the present disclosure, the distance S1 between the first adhesive material 30 and the second adhesive material 40 may be about 0.5 millimeter.

Please continue to refer to FIG. 3 and FIG. 4. The protruding portion 31 of the first adhesive material 30 may overlap the second adhesive material 40. According to some embodiments of the present disclosure, the protruding portion 31 of the first adhesive material 30 may have a substantially parallelogram shape or a rectangular shape. Furthermore, the portion where the protruding portion 31 of the first adhesive material 30 overlaps the second adhesive material 40 may have a substantially parallelogram shape or a rectangular shape.

According to some embodiments of the present disclosure, the protruding portion 31 of the first adhesive material 30 may overlap the second adhesive material 40 in the top view direction (e.g., Z-axis). Moreover, the protruding portion 31 of the first adhesive material 30 that overlaps the second adhesive material 40 and may have a length S2.

According to some embodiments of the present disclosure, the length S2 of the protruding portion 31 of the first adhesive material 30 that overlaps the second adhesive material 40 may be greater than the distance S1 between the first adhesive material 30 and the second adhesive material 40 by about 0.5 millimeter.

According to some embodiments of the present disclosure, the length S2 of the protruding portion 31 of the first adhesive material 30 that overlaps the second adhesive material 40 may be at least greater than or equal to about 1 millimeter. According to some embodiments of the present disclosure, the length S2 of the protruding portion 31 of the first adhesive material 30 that overlaps the second adhesive material 40 may be between 0.5 millimeter and about 1.5 millimeter. According to some embodiments of the present disclosure, the length S2 of the protruding portion 31 of the first adhesive material 30 that overlaps the second adhesive material 40 may be about 1.0 millimeter.

In this way, the foreign substances may be prevented from entering the backlight module 10, and especially water may be prevented from penetrating into the backlight module 10, thereby improving the reliability of the display device 100.

It should be noted that even though the protruding portion 31 of the first adhesive material 30 in the embodiments in FIG. 3 and FIG. 4 overlaps the second adhesive material 40; however, in fact, in other embodiments, configurations of the first adhesive material 30 and the second adhesive material 40 may be interchanged with each other without affecting the advantages of the present disclosure.

Figure 5:
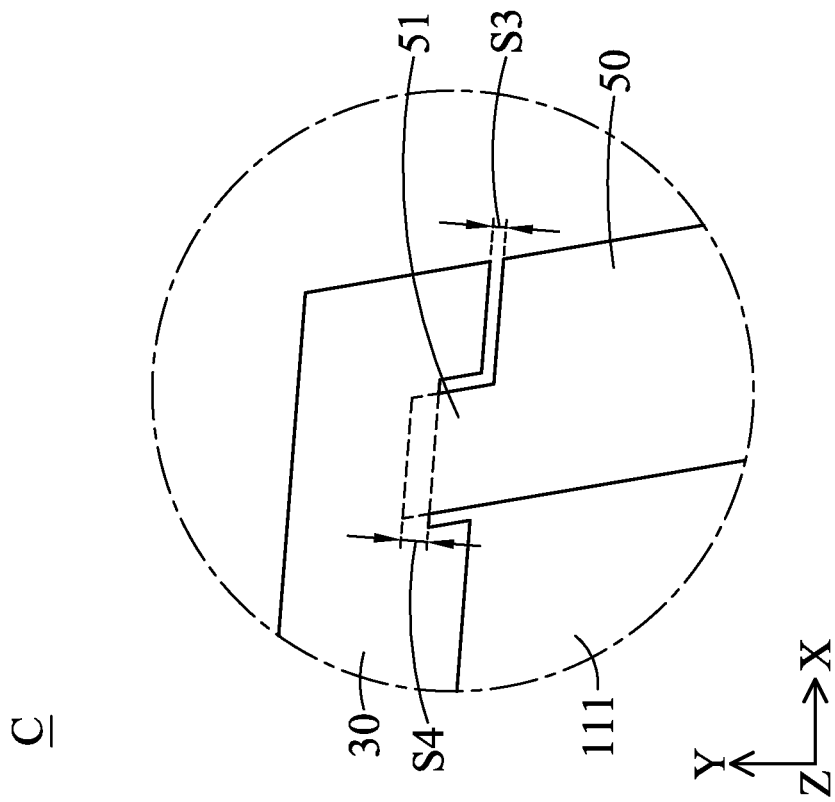
FIG. 5 is an enlarged view of area C in FIG. 2.

Please refer to FIG. 5, FIG. 5 is an enlarged view of area C in FIG. 2.

FIG. 5 may also be a schematic view of the first adhesive material 30 and the third adhesive material 50 according to some embodiments of the present disclosure, wherein the dotted line represents the portion where the third adhesive material 50 overlaps the first adhesive material 30.

As shown in FIG. 5, the third adhesive material 50 may have a protruding portion 51, and the protruding portion 51 of the third adhesive material 50 may be adjacent to the middle portion 111 of the backplane 11. In other words, the protruding portion 51 of the third adhesive material 50 is closer to the middle portion 111 of the backplane 11, and the protruding portion 51 of the third adhesive material 50 is farther away from the edge of the backplane 11.

Similarly, the protruding portion 51 of the third adhesive material 50 may be adjacent to the display area 21 of the panel 20. In other words, the protruding portion 51 of the third adhesive material 50 is closer to the display area 21 of the panel 20, and the protruding portion 51 of the third adhesive material 50 is farther away from the edge of the backplane 11.

As shown in FIG. 5, there may be a distance S3 between the first adhesive material 30 and the third adhesive material 50. According to some embodiments of the present disclosure, the distance S3 between the first adhesive material 30 and the third adhesive material 50 may be between 0 and about 1 millimeter (mm). According to some embodiments of the present disclosure, the distance S3 between the first adhesive material 30 and the third adhesive material 50 may be about 0.5 millimeter.

Please continue to refer to FIG. 5, the protruding portion 51 of the third adhesive material 50 may overlap the first adhesive material 30. According to some embodiments of the present disclosure, the first adhesive material 30 and the third adhesive material 50 may be overlapped at the junction of the long side 11a of the backplane 11 and the first short side 11b of the backplane 11.

According to some embodiments of the present disclosure, the protruding portion 51 of the third adhesive material 50 may have a substantially parallelogram shape or a rectangular shape. In addition, the portion where the protruding portion 51 of the third adhesive material 50 overlaps the first adhesive material 30 may have a substantially parallelogram shape or a rectangular shape.

According to some embodiments of the present disclosure, the protruding portion 51 of the third adhesive material 50 may overlap the first adhesive material 30 in a plan view direction (e.g., Z-axis). Moreover, the protruding portion 51 of the third adhesive material 50 that overlaps the first adhesive material 30 may have a length S4.

According to some embodiments of the present disclosure, the length S4 of the protruding portion 51 of the third adhesive material 50 that overlaps the first adhesive material 30 may be greater than the distance S3 between the first adhesive material 30 and the third adhesive material 50 by about 0.5 millimeter.

According to some embodiments of the present disclosure, the length S4 of the protruding portion 51 of the third adhesive material 50 that overlaps the first adhesive material 30 may be at least greater than or equal to about 1 millimeter. According to some embodiments of the present disclosure, the length S4 of the protruding portion 51 of the third adhesive material 50 that overlaps the first adhesive material 30 may be between 0.5 millimeter and about 1.5 millimeter. According to some embodiments of the present disclosure, the length S4 of the protruding portion 51 of the third adhesive material 50 that overlaps the first adhesive material 30 may be about 1.0 millimeter.

In this way, the foreign substances may be prevented from entering the backlight module 10, and especially water may be prevented from penetrating into the backlight module 10, thereby improving the reliability of the display device 100.

Figure 6:
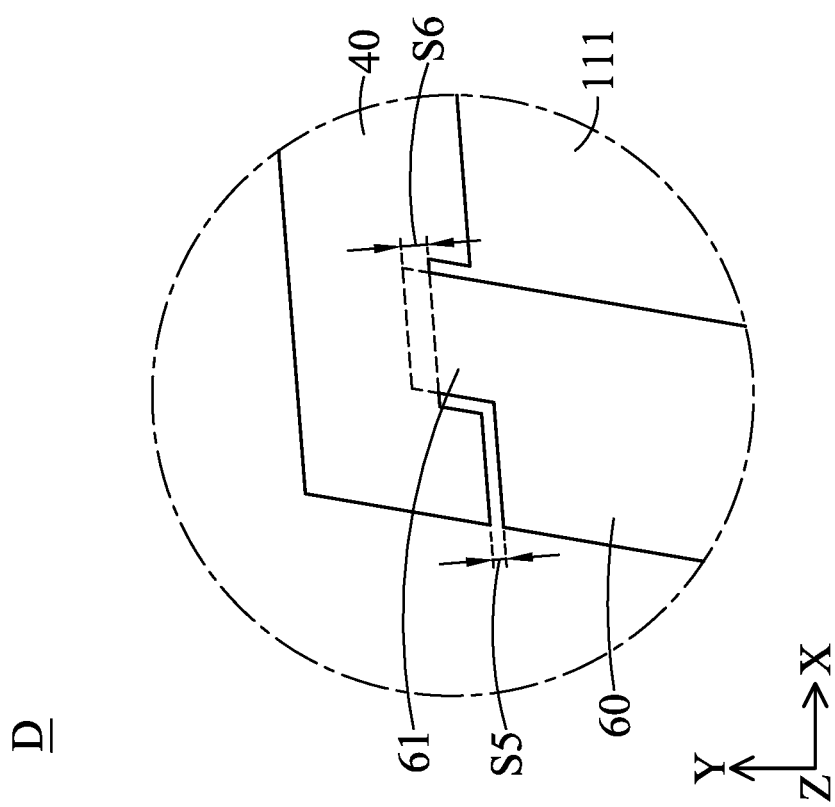
FIG. 6 is an enlarged view of area D in FIG. 2.

Please refer to FIG. 6, FIG. 6 is an enlarged view of area D in FIG. 2. FIG. 6 may also be a schematic view of the second adhesive material 40 and the fourth adhesive material 60 according to some embodiments of the present disclosure, wherein the dotted line represents the portion where the fourth adhesive material 60 overlaps the second adhesive material 40.

As shown in FIG. 6, the fourth adhesive material 60 may have a protruding portion 61, and the protruding portion 61 of the fourth adhesive material 60 may be adjacent to the middle portion 111 of the backplane 11. In other words, the protruding portion 61 of the fourth adhesive material 60 is closer to the middle portion 111 of the backplane 11, and the protruding portion 61 of the fourth adhesive material 60 is farther away from the edge of the backplane 11.

Similarly, the protruding portion 61 of the fourth adhesive material 60 may be adjacent to the display area 21 of the panel 20. In other words, the protruding portion 61 of the fourth adhesive material 60 is closer to the display area 21 of the panel 20, and the protruding portion 61 of the fourth adhesive material 60 is farther away from the edge of the backplane 11.

As shown in FIG. 6, there may be a distance S5 between the second adhesive material 40 and the fourth adhesive material 60. According to some embodiments of the present disclosure, the distance S5 between the second adhesive material 40 and the fourth adhesive material 60 may be between 0 and about 1 millimeter (mm). According to some embodiments of the present disclosure, the distance S5 between the second adhesive material 40 and the fourth adhesive material 60 may be about 0.5 millimeter.

Please continue to refer to FIG. 6, the protruding portion 61 of the fourth adhesive material 60 may overlap the second adhesive material 40. According to some embodiments of the present disclosure, the second adhesive material 40 and the fourth adhesive material 60 may be overlapped at the junction of the long side 11a of the backplane 11 and the second short side 11c of the backplane 11.

According to some embodiments of the present disclosure, the protruding portion 61 of the fourth adhesive material 60 may have a substantially parallelogram shape or a rectangular shape. In addition, the portion where the protruding portion 51 of the third adhesive material 50 overlaps the second adhesive material 40 may have a substantially parallelogram shape or a rectangular shape.

According to some embodiments of the present disclosure, the protruding portion 61 of the fourth adhesive material 60 may overlap the second adhesive material 40 in a plan view direction (e.g., Z-axis). Moreover, the protruding portion 61 of the fourth adhesive material 60 that overlaps the second adhesive material 40 may have a length S6.

According to some embodiments of the present disclosure, the length S6 of the protruding portion 61 of the fourth adhesive material 60 overlapping the second adhesive material 40 may be greater than the distance S5 between the second adhesive material 40 and the fourth adhesive material 60 by about 0.5 millimeter.

According to some embodiments of the present disclosure, the length S6 of the protruding portion 61 of the fourth adhesive material 60 that overlaps the second adhesive material 40 may be at least greater than or equal to about 1 millimeter. According to some embodiments of the present disclosure, the length S6 of the protruding portion 61 of the fourth adhesive material 60 that overlaps the second adhesive material 40 may be between 0.5 millimeter and about 1.5 millimeter. According to some embodiments of the present disclosure, the length S6 of the protruding portion 61 of the fourth adhesive material 60 that overlaps the second adhesive material 40 may be about 1.0 millimeter.

In this way, the foreign substances may be prevented from entering the backlight module 10, and especially water may be prevented from penetrating into the backlight module 10, thereby improving the reliability of the display device 100.

Figure 7:
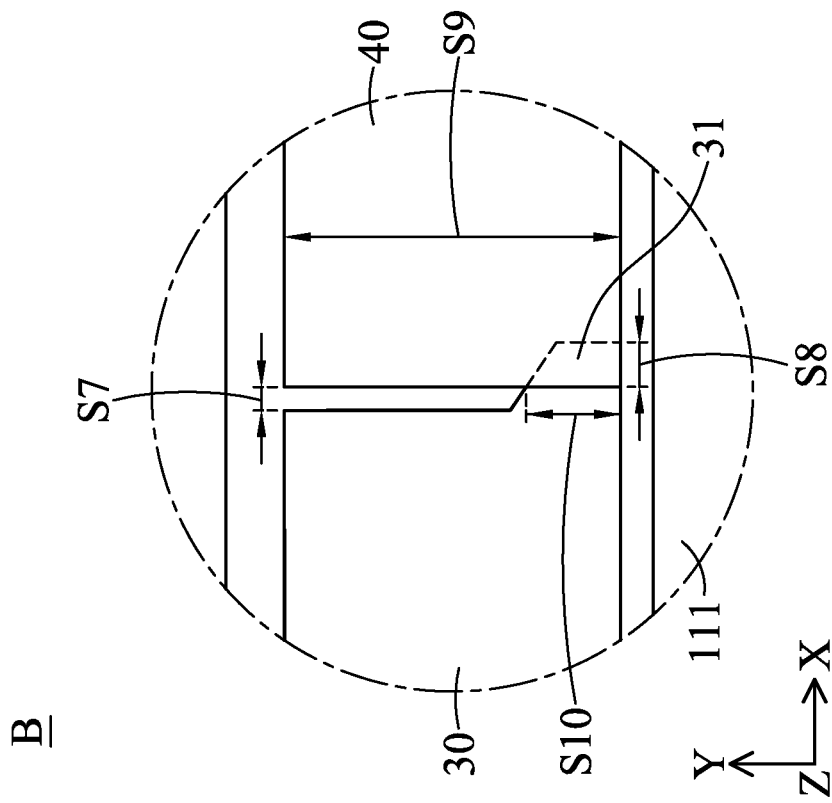
FIG. 7 is a schematic view of the protruding portion of the first adhesive material and the second adhesive material according to some embodiments of the present disclosure, wherein the dotted line represents the portion where the protruding portion of the first adhesive material overlaps the second adhesive material.

Please refer to FIG. 7, FIG. 7 is a schematic view of the protruding portion 31 of the first adhesive material 30 and the second adhesive material 40 according to some embodiments of the present disclosure, wherein the dotted line represents the portion where the protruding portion 31 of the first adhesive material 30 overlaps the second adhesive material 40.

The embodiment in FIG. 7 is similar to the embodiment in FIG. 4, That is, FIG. 7 may be an enlarged view of different embodiments of the area B in FIG. 2, and the main difference is in the shape of the protruding portion 31 of the first adhesive material 30, the similarities may be referred to the previous description, and they will not be repeated here.

As shown in FIG. 7, the protruding portion 31 of the first adhesive material 30 may have a substantially trapezoidal shape, and the height of the trapezoidal shape of the protruding portion 31 of the first adhesive material 30 may be substantially parallel to the long side 11a of the backplane 11 (X-axis).

The upper portion of the trapezoidal shape of the protruding portion 31 of the first adhesive material 30 may overlap the second adhesive material 40. In other words, the upper line of the trapezoidal shape of the protruding portion 31 of the first adhesive material 30 may overlap the second adhesive material 40. As shown in FIG. 7, the portion where the protruding portion 31 of the first adhesive material 30 overlaps the second adhesive material 40 may have a substantially trapezoidal shape.

As shown in FIG. 7, there may be a distance S7 between the first adhesive material 30 and the second adhesive material 40. According to some embodiments of the present disclosure, the distance S7 between the first adhesive material 30 and the second adhesive material 40 may be between 0 and about 1 millimeter (mm). According to some embodiments of the present disclosure, the distance S7 between the first adhesive material 30 and the second adhesive material 40 may be approximately 0.5 millimeter.

According to some embodiments of the present disclosure, the protruding portion 31 of the first adhesive material 30 may overlap the second adhesive material 40 in a plan view direction (e.g., Z-axis). And, the protruding portion 31 of the first adhesive material 30 overlaps the second adhesive material 40 and may have a length S8 (also may be equal to the height of the trapezoidal shape of the portion where the protruding portion 31 of the first adhesive material 30 overlaps the second adhesive material 40).

According to some embodiments of the present disclosure, the length S8 of the protruding portion 31 of the first adhesive material 30 that overlaps the second adhesive material 40 may be greater than the distance S7 between the first adhesive material 30 and the second adhesive material 40 by about 0.5 millimeter.

According to some embodiments of the present disclosure, the length S8 of the protruding portion 31 of the first adhesive material 30 that overlaps the second adhesive material 40 may be at least greater than or equal to about 1 millimeter. According to some embodiments of the present disclosure, the length S8 of the protruding portion 31 of the first adhesive material 30 that overlaps the second adhesive material 40 may be between 0.5 millimeter and about 1.5 millimeter. According to some embodiments of the present disclosure, the length S8 of the protruding portion 31 of the first adhesive material 30 that overlaps the second adhesive material 40 may be about 1.0 millimeter.

According to some embodiments of the present disclosure, the second adhesive material 40 may have a first width S9, and the first width S9 may be substantially parallel to the extending direction (Y-axis) of the first short side 11b or the second short side 11c of the backplane 11.

According to some embodiments of the present disclosure, the protruding portion 31 of the first adhesive material 30 that overlaps the second adhesive material 40 may have a second width S10 (also equal to the portion where the protruding portion 31 of the first adhesive material 30 overlaps the second adhesive material 40 of the trapezoidal shape of the bottom line).

According to some embodiments of the present disclosure, the first width S9 of the second adhesive material 40 may be greater than the second width S10 of the protruding portion 31 of the first adhesive material 30 that overlaps the second adhesive material 40 (S9>S10).

According to some embodiments of the present disclosure, the first width S9 of the second adhesive material 40 and the second width S10 of the protruding portion 31 of the first adhesive material 30 that overlaps the second adhesive material 40 may be within a ratio.

For example, the ratio of the first width S9 of the second adhesive material 40 to the second width S10 where the second width S10 of the protruding portion 31 of the first adhesive material 30 that overlaps the second adhesive material 40 may be about 1:0.2-0.6 (S9:S10=1:0.2-0.6). According to some embodiments of the present disclosure, the aforementioned proportion may be increased or decreased by approximately 5%, 10%, etc.

According to some embodiments of the present disclosure, the area of the portion where the protruding portion 31 of the first adhesive material 30 overlaps the second adhesive material 40 in the embodiment of FIG. 7 may be smaller than the area of the portion where the protruding portion 31 of the first adhesive material 30 overlaps the second adhesive material 40 in the embodiment of FIG. 4.

According to some embodiments of the present disclosure, the portion where the protruding portion 31 of the first adhesive material 30 overlaps the second adhesive material 40 may be about 1.53 square millimeters (mm²).

In this way, the foreign substances may be prevented from entering the backlight module 10, and especially water may be prevented from penetrating into the backlight module 10, thereby improving the reliability of the display device 100.

Moreover, the area of the portion where the protruding portion 31 of the first adhesive material 30 overlaps the second adhesive material 40 may be reduced, so as to avoid excessive concentration of stress on the panel, which may cause local abnormalities in the panel, thereby improving the reliability of the display device 100.

In addition, reducing the area of the portion where the protruding portion 31 of the first adhesive material 30 overlaps the second adhesive material 40 may also make the panel 20 flatter, thereby improving user experience.

Similarly, the embodiment in FIG. 7 may also be applied to the junction of the first adhesive material 30 and the third adhesive material 50 (may refer to FIG. 5), and the junction of the second adhesive material 40 and the fourth adhesive material 60 (may refer to FIG. 6). The detailed description may refer the abovementioned description, which will not be repeated here.

Figure 8:
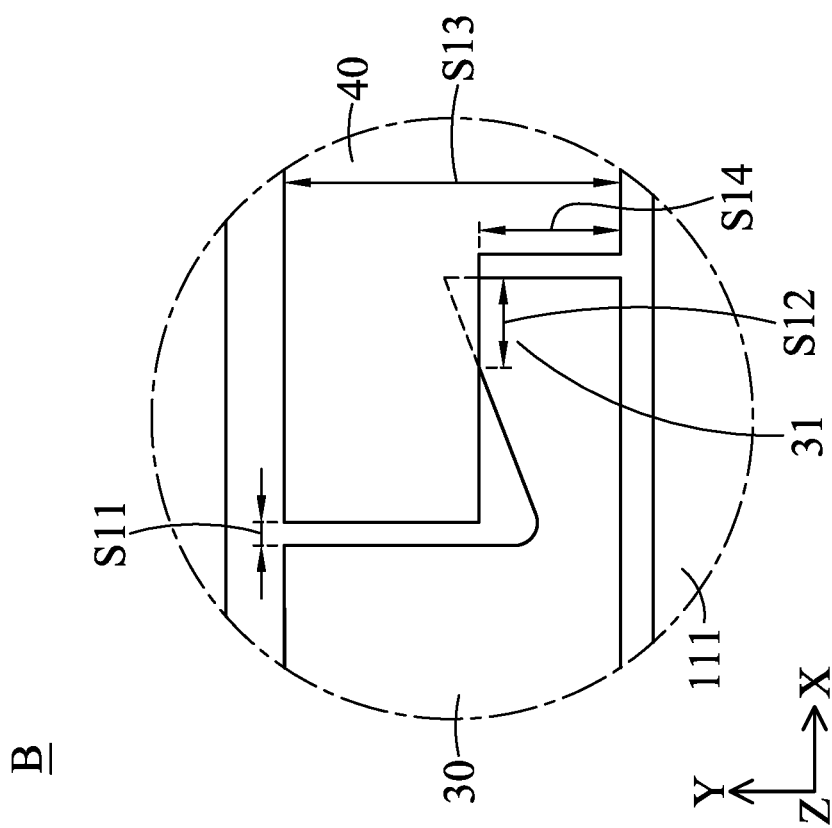
FIG. 8 is a schematic view of the protruding portion of the first adhesive material and the second adhesive material according to some embodiments of the present disclosure, wherein the dotted line represents the portion where the protruding portion of the first adhesive material overlaps the second adhesive material.

Please refer to FIG. 8, FIG. 8 is a schematic view of the protruding portion 31 of the first adhesive material 30 and the second adhesive material 40 according to some embodiments of the present disclosure, wherein the dotted line represents the portion where the protruding portion 31 of the first adhesive material 30 overlaps the second adhesive material 40.

The embodiment in FIG. 8 is similar to the embodiment in FIG. 4, That is, FIG. 8 may be an enlarged view of different embodiments of the area B in FIG. 2, and the main difference is in the shape of the protruding portion 31 of the first adhesive material 30, the similarities may be referred to the previous description, and they will not be repeated here.

As shown in FIG. 8, the protruding portion 31 of the first adhesive material 30 may have a substantially trapezoidal shape, and the height of the trapezoidal shape of the protruding portion 31 of the first adhesive material 30 may be substantially parallel to the extending direction (X-axis) of the long side 11a of the backplane 11.

A portion of the lower portion of the trapezoidal shape of the protruding portion 31 of the first adhesive material 30 may overlap the second adhesive material 40. As shown in FIG. 8, the portion where the protruding portion 31 of the first adhesive material 30 overlaps the second adhesive material 40 may have a substantially triangular shape.

As shown in FIG. 8, there may be a distance S11 between the first adhesive material 30 and the second adhesive material 40. According to some embodiments of the present disclosure, the distance S11 between the first adhesive material 30 and the second adhesive material 40 may be between 0 and about 1 millimeter (mm). According to some embodiments of the present disclosure, the distance S11 between the first adhesive material 30 and the second adhesive material 40 may be about 0.5 millimeter.

According to some embodiments of the present disclosure, the protruding portion 31 of the first adhesive material 30 may overlap the second adhesive material 40 in a plan view direction (e.g., Z-axis). Moreover, the portion where the protruding portion 31 of the first adhesive material 30 overlaps the second adhesive material 40 may have a width S12 (may also be equal to the bottom of the triangular shape of the portion where the protruding portion 31 of the first adhesive material 30 overlaps the second adhesive material 40).

According to some embodiments of the present disclosure, the width S12 of the portion where the protruding portion 31 of the first adhesive material 30 overlaps the second adhesive material 40 may be greater than the distance S7 between the first adhesive material 30 and the second adhesive material 40 by about 1.5 millimeter.

According to some embodiments of the present disclosure, the width S12 of the portion where the protruding portion 31 of the first adhesive material 30 overlaps the second adhesive material 40 may be at least greater than or equal to about 2 millimeter. According to some embodiments of the present disclosure, the width S12 of the portion where the protruding portion 31 of the first adhesive material 30 overlaps the second adhesive material 40 may range from 1.5 millimeter to about 2.5 millimeter. According to some embodiments of the present disclosure, the width S12 of the portion where the protruding portion 31 of the first adhesive material 30 overlaps the second adhesive material 40 may be about 2.0 millimeter.

According to some embodiments of the present disclosure, the second adhesive material 40 may have a first width S13, and the first width S13 may be substantially parallel to the extending direction (Y-axis) of the first short side 11b or the second short side 11c of the backplane 11.

According to some embodiments of the present disclosure, the protruding portion 31 of the first adhesive material 30 may have a second width S14 (which may also be equal to the bottom line of the trapezoidal shape of the protruding portion 31 of the first adhesive material 30).

According to some embodiments of the present disclosure, the first width S13 of the second adhesive material 40 may be greater than the second width S14 of the protruding portion 31 of the first adhesive material 30 (S13>S14).

According to some embodiments of the present disclosure, the first width S13 of the second adhesive material 40 and the second width S14 of the protruding portion 31 of the first adhesive material 30 may be within a ratio.

For example, the ratio of the first width S13 of the second adhesive material 40 to the second width S14 of the protruding portion 31 of the first adhesive material 30 may be about 1:0.6 (S13:S14=1:0.6). According to some embodiments of the present disclosure, the aforementioned ratio may be increased or decreased by about 5%, 10%, etc.

According to some embodiments of the present disclosure, the area of the portion where the protruding portion 31 of the first adhesive material 30 overlaps the second adhesive material 40 in the embodiment of FIG. 8 may be smaller than the area of the portion where the protruding portion 31 of the first adhesive material 30 overlaps the second adhesive material 40 in the embodiment of FIG. 4, and the area of the portion where the protruding portion 31 of the first adhesive material 30 overlaps the second adhesive material 40 in the embodiment of FIG. 7.

According to some embodiments of the present disclosure, the portion where the protruding portion 31 of the first adhesive material 30 overlaps the second adhesive material 40 may be about 0.827 square millimeters (mm²).

In this way, the foreign substances may be prevented from entering the backlight module 10, and especially water may be prevented from penetrating into the backlight module 10, thereby improving the reliability of the display device 100.

Moreover, the area of the portion where the protruding portion 31 of the first adhesive material 30 overlaps the second adhesive material 40 may be reduced, so as to avoid excessive concentration of stress on the panel, which may cause local abnormalities in the panel, thereby improving the reliability of the display device 100.

In addition, reducing the area of the portion where the protruding portion 31 of the first adhesive material 30 overlaps the second adhesive material 40 may also make the panel 20 flatter, thereby improving user experience.

Similarly, the embodiment in FIG. 8 may also be applied to the junction of the first adhesive material 30 and the third adhesive material 50 (may refer to FIG. 5), and the junction of the second adhesive material 40 and the fourth adhesive material 60 (may refer to FIG. 6). The detailed description may refer the abovementioned description, which will not be repeated here.

Figure 9:
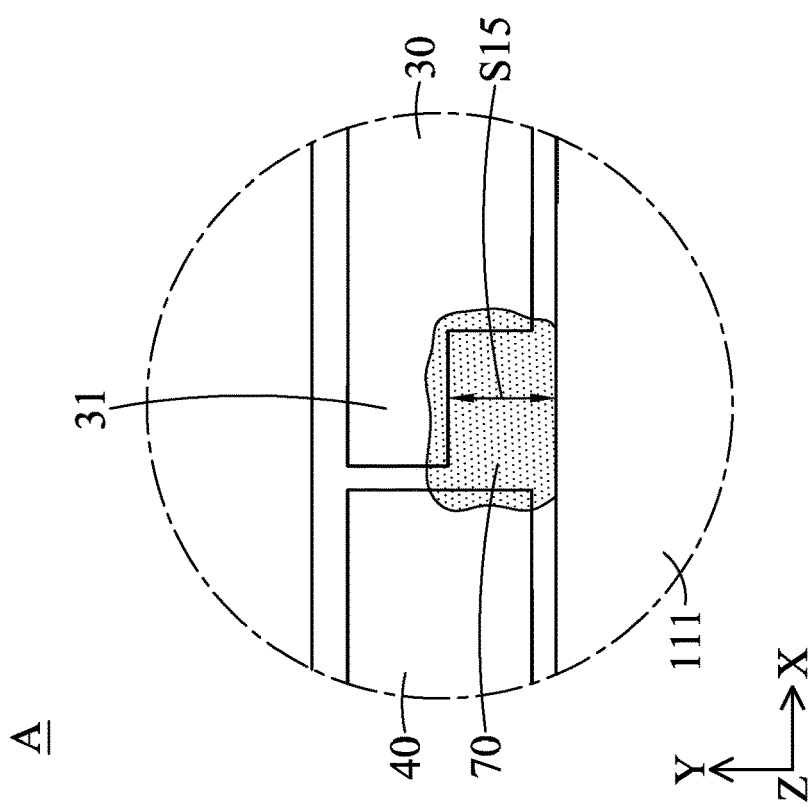
FIG. 9 is a schematic view of the protruding portion of the first adhesive material and the second adhesive material according to some embodiments of the present disclosure.

Please refer to FIG. 9, FIG. 9 is a schematic view of the protruding portion 31 of the first adhesive material 30 and the second adhesive material 40 according to some embodiments of the present disclosure. It should be noted that FIG. 9 may be an enlarged view of different embodiments of area A of FIG. 2.

As shown in FIG. 9, the protruding portion 31 of the first adhesive material 30 may be disposed away from the middle portion 111 of the backplane 11. In other words, the protruding portion 31 of the first adhesive material 30 may be disposed around the middle portion 111 of the backplane 11.

Because the middle portion 111 of the backplane 11 may correspond to the display area 21 of the panel 20 (please refer to FIG. 1). Therefore, the protruding portion 31 of the first adhesive material 30 may be far away from the display area 21 of the panel 20. In other words, the protruding portion 31 of the first adhesive material 30 is closer to the edge of the backplane 11, and the protruding portion 31 of the first adhesive material 30 is farther away from the display area 21 of the panel 20.

According to some embodiments of the present disclosure, the protruding portion 31 of the first adhesive material 30 may have a substantially parallelogram shape or a rectangular shape. According to some embodiments of the present disclosure, the protruding portion 31 of the first adhesive material 30 may be away from the middle portion 111 of the backplane 11 (or the display area 21 of the panel 20) by a distance S15.

According to some embodiments of the present disclosure, the distance S15 between the protruding portion 31 of the first adhesive material 30 and the middle portion 111 of the backplane 11 may range from about 2 millimeter to about 6 millimeter. According to some embodiments of the present disclosure, the distance S15 between the protruding portion 31 of the first adhesive material 30 and the middle portion 111 of the backplane 11 may be about 4 millimeter.

As shown in FIG. 9, the second adhesive material 40 may be disposed between the backplane 11 and the panel 20, and the second adhesive material 40 may be disposed adjacent to the protruding portion 31 of the first adhesive material 30. In other words, the second adhesive material 40 may be disposed around the protruding portion 31 of the first adhesive material 30.

Please continue to refer to FIG. 9. The display device 100 may further include a glue material 70. The glue material 70 may be disposed between the backplane 11 and the panel 20 (FIG. 1).

In the plan view direction (e.g., Z-axis), the glue material 70 may be arranged between the first adhesive material 30 and the second adhesive material 40, and the glue material 70 may be arranged between the protruding portion 31 of the first adhesive material 30 and the middle portion 111 of the backplane 11 (or the display area 21 of the panel 20).

Therefore, the glue material 70 may fill the gap between the first adhesive material 30 and the second adhesive material 40. In this way, the foreign substances may be prevented from entering the backlight module 10, and especially water may be prevented from penetrating into the backlight module 10, thereby improving the reliability of the display device 100.

Furthermore, since the first adhesive material 30 does not overlap the second adhesive material 40, excessive stress concentration on the panel may be avoided, which may cause local abnormalities in the panel, thereby improving the reliability of the display device 100.

In addition, the first adhesive material 30 does not overlap the second adhesive material 40, which may also make the panel 20 flatter, thereby improving the user's experience.

Similarly, the embodiment in FIG. 9 may also be applied to the junction of the first adhesive material 30 and the third adhesive material 50 (may refer to FIG. 5), and the junction of the second adhesive material 40 and the fourth adhesive material 60 (may refer to FIG. 6). The detailed description may refer the abovementioned description, which will not be repeated here.

Figure 10:
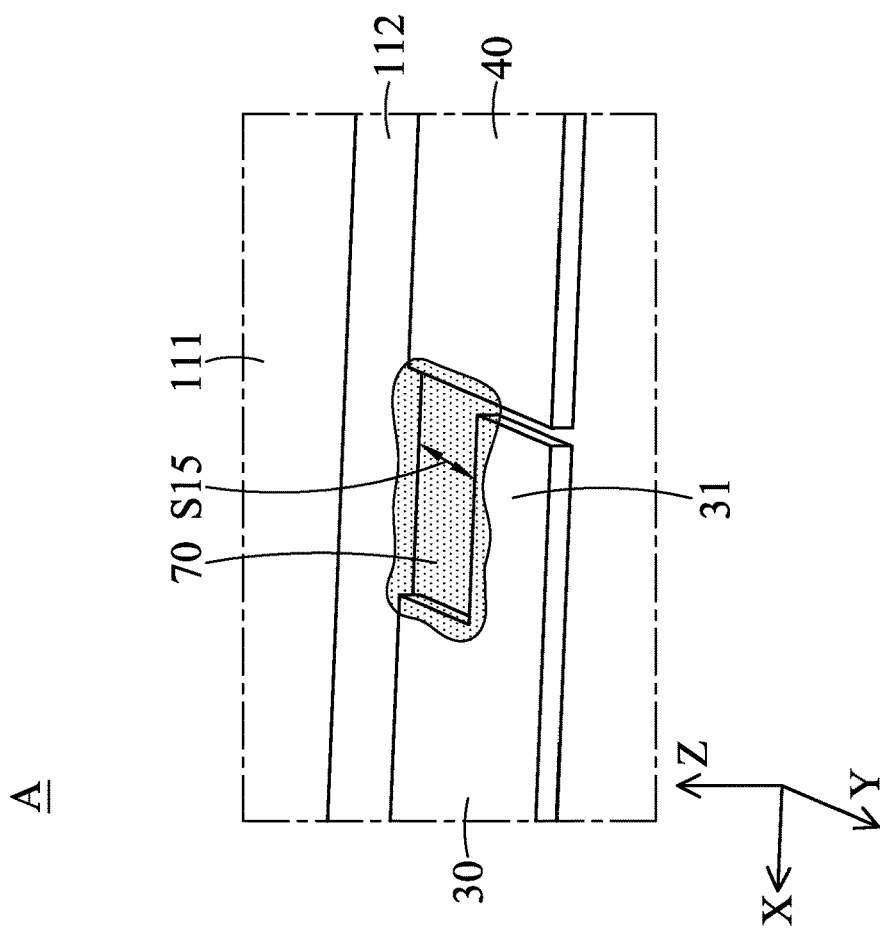
FIG. 10 is a schematic view of the backplane according to some embodiments of the present disclosure.

Please refer to FIG. 10, FIG. 10 is a schematic view of the backplane 11 according to some embodiments of the present disclosure. It should be noted that FIG. 10 may be an enlarged view of a different embodiment of area A of FIG. 2.

According to some embodiments of the present disclosure, the backplane 11 may further include a side wall 112. The sidewall 112 of the backplane 11 may be disposed between the glue material 70 and the middle portion 111 of the backplane 11 (or the display area 21 of the panel 20). Moreover, the side wall 112 of the backplane 11 may have a height S16. According to some embodiments of the present disclosure, the height S16 of the side wall 112 may be greater than or equal to about 2 millimeter.

The side wall 112 of the backplane 11 may prevent the glue material 70 from overflowing to the middle portion 111 of the backplane 11 or the display area 21 of the panel 20. In this way, the reliability of the display device 100 may be improved.

Similarly, the embodiment in FIG. 10 may also be applied to the junction of the first adhesive material 30 and the third adhesive material 50 (may refer to FIG. 5), and the junction of the second adhesive material 40 and the fourth adhesive material 60 (may refer to FIG. 6). The detailed description may refer the abovementioned description, which will not be repeated here.

In summary, embodiments of the present disclosure provide a display device. In some embodiments, the first adhesive material may overlap the second adhesive material, so as to prevent water from penetrating into the backlight module to improve the reliability of the display device. In some embodiments, the first adhesive material may overlap the third adhesive material, so as to prevent water from penetrating into the backlight module to improve the reliability of the display device. In some embodiments, the second adhesive material may overlap the fourth adhesive material, so as to prevent foreign substances from entering the backlight module, especially to prevent water from penetrating into the backlight module, thereby improving the reliability of the display device.

Embodiments of the present disclosure also provide a display device. In some embodiments, the overlapped area of the first adhesive material and the second adhesive material may be reduced to avoid excessive stress concentration, thereby improving the reliability of the display device. Moreover, the panel may be flatter, thereby improving user experience.

Embodiments of the present disclosure further provide a display device. In some embodiments, the first adhesive material may not overlap the second adhesive material, and the glue material is disposed between the first adhesive material and the second adhesive material, and between the first adhesive material and the side wall of the backplane, This prevents foreign substances from entering the backlight module, especially to prevent water from penetrating into the backlight module, thereby improving the reliability of the display device. In addition, excessive stress concentration on the panel may be avoided, which may cause local abnormalities in the panel, thereby improving the reliability of the display device. In addition, the panel may be made flatter, thereby improving user experience. In addition, the overflow of the glue material may also be avoided, so as to improve the reliability of the display device.

Although the embodiments and the advantages of the present disclosure have been described above, it should be understood that those skilled in the art may make various changes, substitutions, and alterations to the present disclosure without departing from the spirit and scope of the present disclosure. It should be noted that different embodiments may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. A display device, comprising:
   a backlight module, comprising a backplane;
   a panel, disposed on the backplane, comprising a display area;
   a first adhesive material, disposed between the backplane and the panel, wherein the first adhesive material has a protruding portion adjacent to the display area; and
   a second adhesive material, disposed between the backplane and the panel;
   characterized in that,
   wherein the protruding portion overlaps the second adhesive material,
   wherein the backplane comprises a long side, and the first adhesive material and the second adhesive material are attached along the extending direction of the long side,
   wherein the backplane comprises a first short side, the first short side is connected to the long side, wherein the display device further comprises a third adhesive material, and the third adhesive material is attached along the extending direction of the first short side.

2. The display device as claimed in claim 1, characterized in that,
   wherein the protruding portion overlaps the second adhesive material by a length, and the length is greater than or equal to 0.5 millimeter and less than or equal to 1.5 millimeter.

3. The display device as claimed in claim 1, characterized in that,
   wherein the second adhesive material has a first width, and the protruding portion has a second width, wherein the first width is greater than the second width.

4. The display device as claimed in claim 3, characterized in that,
   wherein the first width and the second width are within a ratio, and the ratio is greater than or equal to 0.2 and less than or equal to 0.6.

5. The display device as claimed in claim 1, characterized in that,
   wherein the first adhesive material and the third adhesive material overlap at the junction between the long side and the first short side.

6. The display device as claimed in claim 1, characterized in that,
   wherein the backplane comprises a second short side, and the second short side is connected to the long side, wherein the display device further comprises a fourth adhesive material, and the fourth adhesive material is attached along the extending direction of the second short side.

7. The display device as claimed in claim 6, characterized in that,
   wherein the second adhesive material and the fourth adhesive material overlap at the junction of the long side and the second short side.

8. A display device, comprising:
   a backlight module, comprising a backplane;
   a panel, disposed on the backplane, comprising a display area;
   a first adhesive material, disposed between the backplane and the panel, wherein the first adhesive material has a protruding portion away from the display area;
   a second adhesive material, disposed between the backplane and the panel, wherein the second adhesive material is adjacent to the protruding portion; and
   a glue material, disposed between the backplane and the panel;
   characterized in that,
   wherein in the plan view direction, the glue material is disposed between the first adhesive material and the second adhesive material, and the glue material is disposed between the protruding portion and the display area,
   wherein the backplane comprises a long side, and the first adhesive material and the second adhesive material are attached along the extending direction of the long side,
   wherein the backplane comprises a first short side, the first short side is connected to the long side,
   wherein the display device further comprises a third adhesive material, and the third adhesive material is attached along the extending direction of the first short side.

9. The display device as claimed in claim 8, characterized in that,
   wherein the backplane comprises a side wall, and the side wall is disposed between the glue material and the display area.

10. The display device as claimed in claim 9, characterized in that,
    wherein the side wall has a height, and the height is greater than or equal to 2 millimeter.

11. The display device as claimed in claim 8, characterized in that,
    wherein the backplane comprises a second short side, and the second short side is connected to the long side.

12. The display device as claimed in claim 11, characterized in that,
   wherein the display device further comprises a fourth adhesive material, and the fourth adhesive material is attached along the extending direction of the second short side.

13. The display device as claimed in claim 8, characterized in that,
   wherein the protruding portion of the first adhesive material is away from the display area by a distance, and the distance ranges from 2 millimeter to 6 millimeter.

14. The display device as claimed in claim 13, characterized in that,
   wherein the distance is 4 millimeter.

15. The display device as claimed in claim 8, characterized in that,
   wherein the glue material fills the gap between the first adhesive material and the second adhesive material.

\* \* \* \* \*